(12) United States Patent
Malone et al.

(10) Patent No.: US 7,054,721 B2
(45) Date of Patent: May 30, 2006

(54) COMPUTER FAN EFFICIENCY FEEDBACK SYSTEM AND METHOD

(75) Inventors: Christopher G. Malone, Loomis, CA (US); Chandrakant D. Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 10/759,781

(22) Filed: Jan. 15, 2004

(65) Prior Publication Data

US 2005/0159845 A1   Jul. 21, 2005

(51) Int. Cl.
*G06F 1/20* (2006.01)
(52) U.S. Cl. .................. 700/300; 700/108; 361/687; 713/300
(58) Field of Classification Search ................. 700/79, 700/276, 299, 300; 361/687, 690, 695; 702/130; 713/300, 321; 73/168
See application file for complete search history.

(56) References Cited

U.S. PATENT DOCUMENTS

| | | | | |
|---|---|---|---|---|
| 4,549,601 A | * | 10/1985 | Wellman et al. | 165/205 |
| 5,727,928 A | * | 3/1998 | Brown | 417/44.11 |
| 6,654,894 B1 | * | 11/2003 | Kaminski et al. | 713/300 |
| 6,856,139 B1 | * | 2/2005 | Rijken et al. | 324/537 |
| 6,891,347 B1 | * | 5/2005 | Dobbs et al. | 318/471 |
| 6,901,303 B1 | * | 5/2005 | Larson et al. | 700/108 |

* cited by examiner

*Primary Examiner*—Leo Picard
*Assistant Examiner*—Douglas S. Lee

(57) ABSTRACT

A computer fan efficiency feedback system and method are presented. In one embodiment, an indication electronic components are operating is received. A cooling system is directed to provide air flow to the electronic components. In one exemplary implementation the cooling system includes a fan. The fan speed is modulated in accordance with a fan speed efficiency control plan. For example, the fan speed efficiency control plan includes directions for changing or modulating the fan speed to a value that maximizes an efficiency ratio of flow work to input power supplied to the fan.

20 Claims, 4 Drawing Sheets

100

Receiving an indication electronic components are operating.
110

↓

Directing a cooling system to provide air flow to the electronic components.
120

↓

Modulating the speed of a fan in the cooling system in accordance with a fan speed efficiency control plan.
130

100

```
Receiving an indication electronic components
are operating.
110
```
↓
```
Directing a cooling system to provide air flow to
the electronic components.
120
```
↓
```
Modulating the speed of a fan in the cooling
system in accordance with a fan speed
efficiency control plan.
130
```

```
Determining flow resistance characteristics of a computer system.
210
                          │
                          ▼
Examining the performance of a fan in the absence of flow resistance.
220
                          │
                          ▼
Analyzing the efficiency of a fan.
230
                          │
                          ▼
Selecting an operation point for the fan at which fan efficiency is
optimized and fan speed is minimized.
240
```

FIG. 2

COMPUTER FAN EFFICIENCY FEEDBACK SYSTEM AND METHOD

FIELD OF THE INVENTION

The present invention relates to computer system cooling fan operation. More particularly, the present invention relates to a computer fan efficient feedback system and method.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these advantageous results typically produce heat as a by product of various processing activities. However, the electronic systems also typically have temperature operation thresholds which if exceeded can cause damage to the electronic systems and/or result in the electronic systems providing unreliable results. Maintaining the temperature of the electronic systems within the thresholds often consumes significant power which can be expensive and also reduce power supply capacity.

Power is consumed by a variety of components within a computer system. Power consumption can be considerable and expensive in centralized computer facilities that operate a large number of computer systems. For example, power consumption is usually a significant portion of operating expenses in a centralized server facility such as a server farm or internet provider.

Another important consideration for a number of computer systems is power supply capacity. Power supply capacity is often limited in a number of computer systems such as portable or mobile computer systems. For example, a number of portable or mobile computer systems operate off limited battery power supplies and even if the batteries are rechargeable it is not always convenient to recharge them. Recharging the batteries typically involves a hard wire connection to a utility power supply and the hard wire connections often tend to reduce the portability advantages of the system. Power consumed by a cooling system including fan operations typically results in less power available for the primary activities of the computer system, such as processing information, displaying results on a monitor, communicating results via a network, etc. The limitations on the power supply capacity tend to increase the significance of impacts associated with power consumed by cooling systems.

Computer systems typically have cooling systems comprising a fan utilized to help provide maintenance of a system temperature. The fan typically blows cool air into ambient spaces around electronic components. The electronic components dissipate heat into the ambient air. The dissipation rate and capacity is proportional to the difference in the temperature of the ambient air and the temperature of the electronic components. Additional cool air flowing into the ambient space of the electronic components pushes out hotter air and permits the electronic components to dissipate greater amounts of heat maintaining a lower temperature. Fan speed is increased to provide additional cool air. Greater amounts of power are consumed as the fan speed is increased.

Power consumed by computer system cooling fans has increased dramatically as cooling demands have increased. The demand for ever more sophisticated and complex computer systems drive development or systems that require additional cooling capacity. The traditional approach of operating fans at a predetermined maximum speed tends to put increased strains and demands on power supplies. The increases can be exponential as fan power consumption is proportional to fan speed raised to the third power. While traditional approaches of operating a fan at a maximum speed can often achieve temperature threshold maintenance it also usually impacts the expense of operating the system and can reduce the capabilities of mobile systems.

SUMMARY OF THE INVENTION

A computer fan efficiency feedback system and method are presented. In one embodiment, an indication electronic components are operating is received. A cooling system is directed to provide air flow to the electronic components. In one exemplary implementation the cooling system includes a fan. The fan speed is modulated in accordance with a fan speed efficiency control plan. For example, the fan speed efficiency control plan includes directions for changing or modulating the fan speed to a value that maximizes an efficiency ratio of flow work to input power supplied to the fan.

BRIEF DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 1 is a flow chart of a computer fan efficiency feedback method in accordance with one embodiment of the present invention.

FIG. 2 is a flow chart of a fan speed efficiency control plan method in accordance with one embodiment of the present invention.

DETAILED DESCRIPTION OF THE INVENTION

Figure 3:
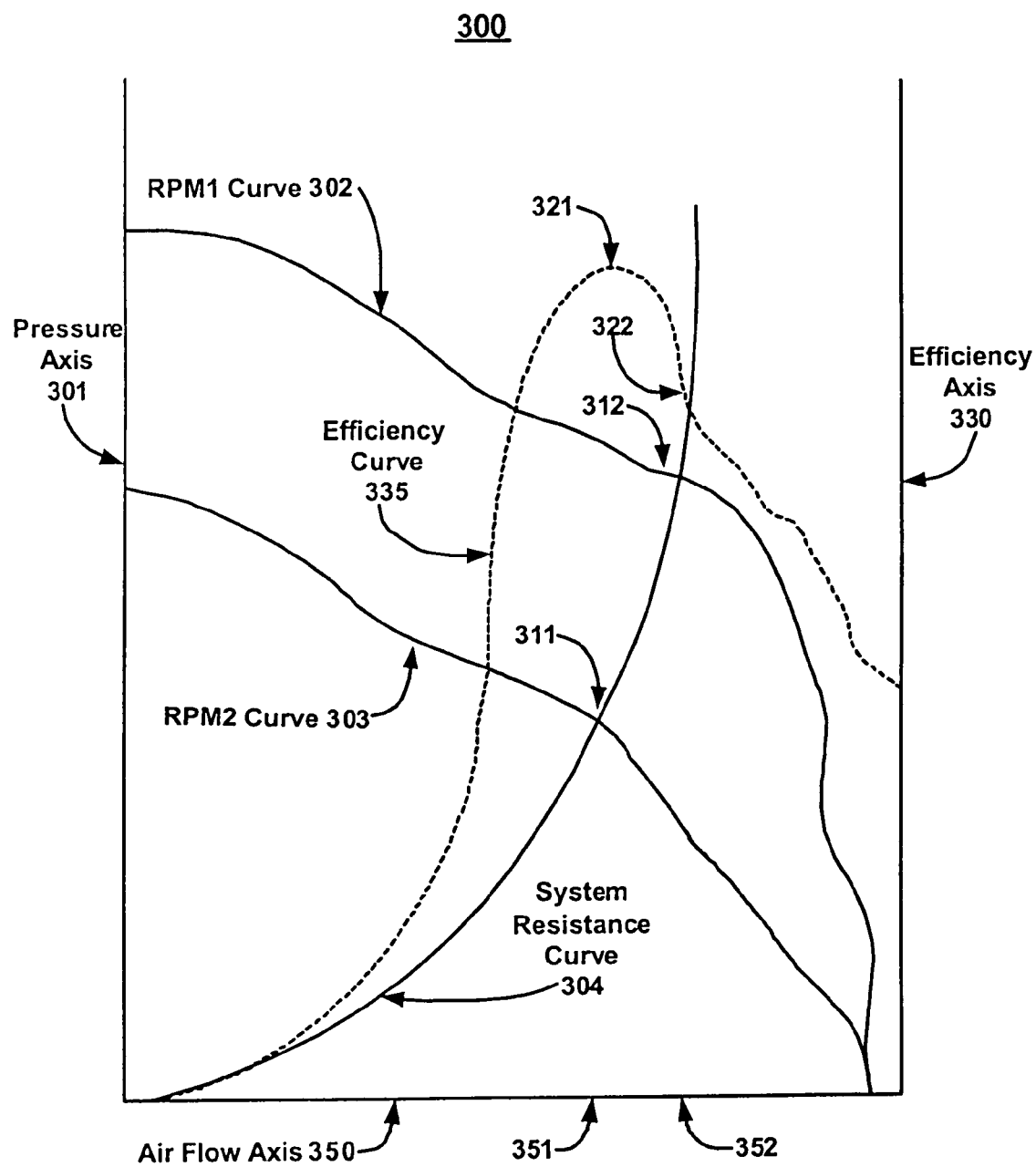
FIG. 3 is a fan speed performance efficiency graph in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it is understood the present invention may be practiced without these specific details. In other instances, some readily understood methods, procedures, components, and circuits have not been described in detail as not to unnecessarily obscure aspects of the current invention.

The present invention facilitates efficient operation of cooling fans in a computer system. Operating computer system cooling fans in accordance with embodiments of the present invention also facilitates conservation of power. Present invention computer fan efficiency feedback systems and methods provide feedback on efficiency characteristics of fan operation for various computer system configurations and the efficiency characteristics are utilized to modulate fan speed accordingly. The present invention also includes safety over ride features that prevent efficiency instructions from damaging computer system components due to temperature thresholds being exceeded.

FIG. 1 is a flow chart of computer fan efficiency feedback method 100 in accordance with one embodiment of the present invention. Computer fan efficiency feedback method 100 facilitates power conservation while maintaining efficient cooling of computer system components.

In step 110, an indication electronic components are operating is received. The electronic components can inherently dissipate heat as a consequence of performing operations. In one embodiment of the present invention the electronic components are included in a computer system. It is appreciated that the present invention is readily implemented for a variety of electronic components in a number of different configurations. For example, the present invention can be implemented in cooling systems of compact computer system servers (e.g., a plurality of servers mounted in an equipment rack).

In step 120, a cooling system is directed to provide air flow to said electronic components. In one embodiment of the present invention, air flow is provided by a fan. The air flow is resisted by various configurations of the system. For example, air flow can be resisted by vents or baffles in enclosures in which the system is mounted (e.g., computer system chassis, equipment rack, etc.). Air flow resistance can also change according to the number and/or configuration of components included in a system. For example, the number, size, and configurations of processors, memories, and/or printed circuit cards in a computer system can impact the air flow resistance.

Referring still to FIG. 1, the speed of a fan in the cooling system is modulated at step 130 in accordance with a fan speed efficiency control plan. The fan speed is changed to correspond to an optimized fan efficiency value. In one embodiment, the fan speed efficiency control plan sets guidelines for modulating fan speed to a value that maximizes an efficiency ratio. The efficiency ratio is a ratio of flow work of the fan to input power supplied to the fan. In one exemplary implementation, the flow work is defined as a static pressure delivered by the fan times the fan volumetric flow rate.

In one embodiment of the present invention, modulation of the fan speed is subject to cooling constraints. For example, modulation of the fan can be overridden by a temperature reading and the fan is set to a maximized cooling level. It is appreciated that a variety of temperature readings can be utilized. For example, ambient temperature around the electronic equipment can be monitored. In addition temperature of the electronic equipment can be measured (e.g., with a thermal couple device).

FIG. 2 is a flow chart of fan speed efficiency control plan method 200 in accordance with one embodiment of the present invention. Fan speed efficiency control plan method 200 provides instructions included in a fan speed efficiency control plan for operating a fan. The instructions direct operation of a fan at a rotational rate (e.g., RPM) or speed that optimizes cooling and power consumption efficiency of the fan.

In step 210, flow resistance characteristics of a computer system are determined. The impact of items in the air flow path on flow resistance is analyzed as part of the flow resistance characteristics determination. In one embodiment of the present invention, flow resistance characteristics of the computer system are determined for a variety of electronic component configurations in the computer system. Various air in flow and out flow characteristics (e.g., associated with vents, baffles, etc.) of mounting enclosures (e.g., chassis, racks, etc.) are also determined.

In step 220, the performance of a fan in the absence of flow resistance is examined. In one embodiment, the performance of a fan on a test bench without resistance from system components and/or mounting enclosure air flow features is examined. In one exemplary implementation, the examination of the fan performance in the absence of flow resistance indicates there is zero static pressure delivered by the fan and the volumetric flow rate (e.g., cubic feet per minute) is at a maximum.

With reference still to FIG. 2, the efficiency of the fan is analyzed in step 230. In one embodiment, analyzing efficiency of the fan includes establishing a ratio of flow work of the fan to input power supplied to the fan. An optimal efficiency value is established by the analysis. In one exemplary implementation, the optimal efficiency point is defined by the greatest value of the static pressure delivered by the fan times the fan volumetric flow rate divided by the power input to the fan.

In step 240, an operation point is selected for the fan at which fan efficiency is optimized and fan speed is minimized. In one exemplary implementation, control commands are developed to control the fan operation in accordance with the operating point. The operating point is the intersection between fan static pressure and system resistance, which defines the volumetric rate a fan is capable of driving through a system.

In one embodiment of the present invention, fan speed efficiency control plan method 200 also includes establishing a temperature limit point at which damage to the computer system begins to occur. An operating point is set at a level that prevents the temperature limit from being exceeded. For example, fan speed is increased to provide an absolute reduction in temperature without feedback on relative efficiency impacts.

FIG. 3 is a fan speed performance efficiency graph 300 in accordance with one embodiment of the present invention. Fan speed performance efficiency graph 300 shows static pressure as a function of flow rate at constant fan speeds and also shows fan efficiency. Fan speed performance efficiency graph 300 includes a pressure axis 301, an efficiency axis 330, air flow axis 350, fan speed RMP1 curve 302, fan speed RMP2 curve 303, efficiency curve 335, and system resistance curve 304. Pressure axis 301 indicates change in pressure values. Efficiency axis 330 indicates changes in efficiency values. Air flow axis 350 indicates changes in the amount of air flow. In one exemplary implementation, air flow is measure in cubic feet per minute.

The fan speed RMP1 curve 302 and fan speed RMP2 curve 303 illustrate that as flow rate is increased through the fan the static pressure the fan delivers decreases. The fan speed RMP1 curve 302 and fan speed RMP2 curve 303 are characteristics of a fan exhibited in the absence of air flow resistance from a system. Fan speed RMP1 curve 302 maps out the changes in pressure values for corresponding changes in air flow at a first constant fan speed. Fan speed RMP2 curve 303 maps out the changes in pressure values for corresponding changes in air flow at a second constant fan speed. In one exemplary implementation, fan speed is measure in revolutions per minute (RPM). System resistance curve 304 indicates the impact of system resistance to air flow as the flow rate increases.

With reference still to FIG. 3, there are various operating points indicated in fan speed performance efficiency graph 300. The operating points correspond to the static pressure a fan is capable of providing for a given flow rate and system resistance. For example, the theoretical potential capacity of the fan mapped against the air flow resistance of the system. For example, operating point 312 indicates the operating point at a first fan speed RPM1. Operating point 311 indicates the operating point as a second fan speed RPM2. The operating point changes as the speed of the fan changes.

Referring still to FIG. 3, there are also various efficiency points indicated in fan speed performance efficiency graph 300. The efficiency points correspond to efficiency values. The efficiency values correspond to the ratio of the flow work (e.g., static pressure delivered by the fan times the volumetric rate) to input power. In one embodiment of the present invention, efficiency is defined by the following equation:

$$\mu = \Delta PV/bhp$$

where $\mu$ is fan efficiency, $\Delta P$ is the change in pressure, V is the volumetric rate and bhp is the brake horse power (e.g., input power).

As illustrated in the exemplary fan speed performance efficiency graph 300 of FIG. 3, greater efficiency is achievable at lower fan speeds. The operating point 311 associated with slower fan speed RMP2 curve 303 is capable of achieving a greater efficiency indicated by efficiency point 321 than operating point 312 associated with faster fan speed RMP1 curve 302. The efficiency point 321 is greater than efficiency point 322 corresponding to operating point 312. Thus, by slowing down a fan speed greater efficiency 312 is achieved and less power is consumed at the slower fan speed.

Figure 4:
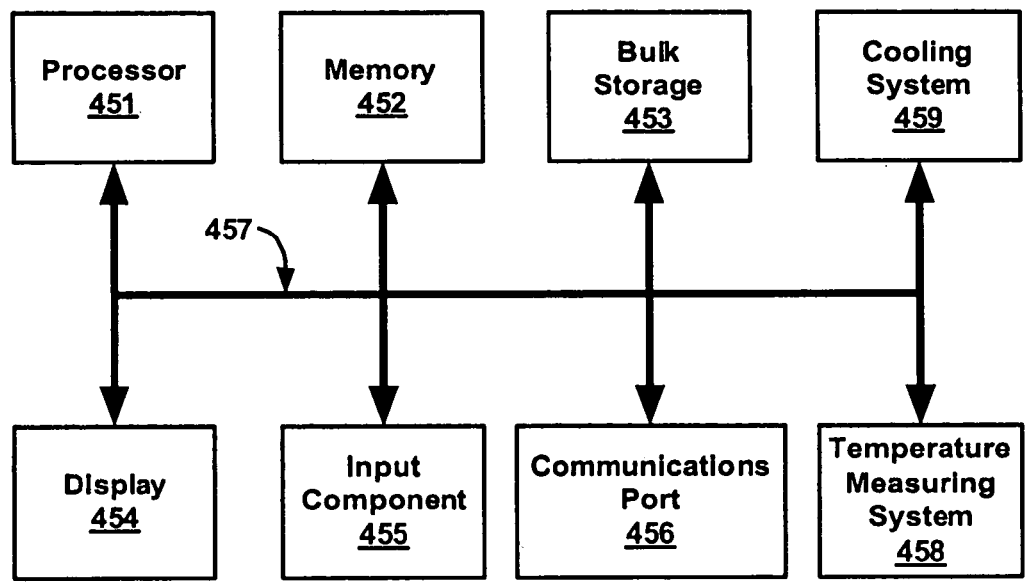
FIG. 4 is a block diagram of a computer system in accordance with one embodiment of the present invention.

FIG. 4 is a block diagram of computer system 400 in accordance with one embodiment of the present invention. Computer system 400 includes communication bus 457, processor 451, memory 452, bulk storage component 453 (e.g., a disk drive), display module 454, input component 455, network communication port 456 and fan cooling system 459. Communication bus 457 is coupled to central processor 451, memory 452, bulk storage component 453, display module 454, input component 455, network communication port 456 and fan cooling system 459.

The components of computer system 400 cooperatively operate to provide a variety of functions, including modulating fan operation in accordance with the present invention. Communication bus 457 communicates information within computer system 400. Processor 451 processes information and instructions. Memory 452 stores information and instructions. Bulk storage component 453 also provides storage of information (e.g., rack equipment description information, policy information, etc.). Fan cooling system 459 cools the temperature of the bus, processor and memory in an efficient balance of cooling and power consumption.

Referring still to FIG. 4, in one embodiment of the present invention, fan cooling system 549 comprises a fan and a fan controller. The fan controller controls the fan revolution rate. Fan cooling system 549 alters the speed of the fan to optimize flow work in relation to power supplied to the fan. The flow work is defined as a static pressure delivered by the fan times the fan volumetric flow rate. In one exemplary implementation, processor 451 directs the cooling system 459 operations in accordance with a fan speed efficiency control plan.

In one embodiment of the present invention, computer system 400 includes temperature measuring system 458 for measuring temperature of the system (e.g., the processor and memory). The modulation of the fan speed for efficiency can be over ridden by a temperature reading. The fan speed can be set to a maximized cooling level to help prevent temperature related damage to the electronic components (e.g., processor 451, memory 452, etc.) if the temperature measurement exceeds predetermined thresholds.

With reference still to FIG. 4, in one embodiment of the present invention, various interface activities can be implemented by input component 455, display module 454 and network communications port 456. Input component 455 facilitates communication of information to computer system 400. For example, various fan speed efficiency control plan information can be entered via input component 455. Display module 454 displays information to a user. In one embodiment of the present invention, display module 454 can be utilized to convey information regarding fan cooling operations, including the speed of the ran rotation and various temperature measurements associated with computer system 400. Network communication port 459 provides a communication port for communicatively coupling with a network (e.g., for downloading fan speed efficiency control plan related information including updates to fan performance and setting information).

Thus, the present invention facilitates optimization of fan cooling system efficiency and conservation of power. Providing fan efficiency feedback for fan operation modulation enables a fan to be operated at slower rates. Operating the fan at slower rates permits power to be conserved. Alternatively, power that would otherwise be consumed by fan operation can be utilized for other activities, include processing activities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various modifications as are suited to the particular use contemplated. It is intended that the scope of the invention be defined by the claims appended hereto and their equivalents.

What is claimed is:

1. A computer fan efficiency feedback method comprising:
   receiving an indication electronic components are operating and dissipating heat;
   directing a cooling system to provide air flow to said electronic components; and
   modulating speed of a fan in said cooling system in accordance with a fan speed efficiency control plan, wherein said fan speed efficiency control plan sets guidelines for modulating a fan speed to values that improve efficiency ratios.

2. The computer fan efficiency feedback method of claim 2 wherein said values maximize efficiency ratios.

3. The computer fan efficiency feedback method of claim 2 wherein said efficiency ratio is a ratio of flow work of said fan to input power supplied to said fan.

4. The computer fan efficiency feedback method of claim 3 wherein said flow work is defined as a static pressure delivered by said fan times said fan volumetric flow rate.

5. The computer fan efficiency feedback method of claim 1 further comprising overriding said modulating by a temperature reading and setting said fan to a maximized cooling level.

6. A computer fan efficiency feedback method of claim 1 further comprising monitoring ambient temperature around said electronic components.

7. A computer fan efficiency feedback method of claim 1 further comprising measuring the temperature of said electronic equipment with a thermal couple device.

8. A computer fan efficiency feedback system comprising:
a bus for communicating information;
a processor coupled to said bus, said processor for processing said information;
a memory coupled to said bus, said memory for storing said information; and
a fan cooling system coupled to said bus, said fan cooling system for cooling said temperature of said bus, processor and memory in accordance with an optimized balance of cooling and power consumption.

9. A computer fan efficiency feedback system of claim 8 wherein said fan cooling system comprises a fan and a fan controller, wherein said fan controller controls said fan revolution rate.

10. A computer fan efficiency feedback system of claim 8 wherein said fan cooling system alters the speed of a fan to optimize flow work in relation to power supplied to said fan.

11. A computer fan efficiency feedback system of claim 8 wherein said flow work is defined as a static pressure delivered by said fan times said fan volumetric flow rate.

12. A computer fan efficiency feedback system of claim 8 wherein said processor directs said cooling system in accordance with a fan speed efficiency control plan.

13. A computer fan efficiency feedback system of claim 8 further comprising a temperature measuring system for measuring temperature of said processor and memory.

14. A computer fan efficiency feedback method of claim 13 further comprising overriding said modulating by a temperature reading and setting said fan to a maximized cooling level.

15. A fan speed efficiency control plan method comprising:
determining flow resistance characteristics of a computer system;
examining the performance of a fan in the absence of flow resistance;
analyzing efficiency of said fan; and
selecting an operation point for said fan at which fan efficiency is optimized and fan speed is minimized.

16. A fan speed efficiency control plan method of claim 15 wherein determining the resistance characteristics of the system includes analyzing the impact of items in the air flow path on flow resistance.

17. A fan speed efficiency control plan method of claim 15 wherein analyzing efficiency of said fan includes establishing a ratio of flow work of said fan to input power supplied to said fan.

18. A fan speed efficiency control plan method of claim 15 further comprising establishing a temperature limit point at which damage to said computer system begins to occur and setting an operating point at a level that prevents said temperature limit from being exceeded.

19. A fan speed efficiency control plan method of claim 15 further comprising developing instructions to control said fan operation in accordance with said operating point.

20. A fan speed efficiency control plan method of claim 15 wherein said operating point is an intersection between fan static pressure and system resistance, wherein said intersection defines a volumetric rate said fan is capable of driving through a system.

\* \* \* \* \*

UNITED STATES PATENT AND TRADEMARK OFFICE
CERTIFICATE OF CORRECTION

PATENT NO. : 7,054,721 B2
APPLICATION NO. : 10/759781
DATED : May 30, 2006
INVENTOR(S) : Christopher G. Malone It is certified that error appears in the above-identified patent and that said Letters Patent is hereby corrected as shown below:

In the Claims

In column 7, line 2, in Claim 2, delete "2" and insert -- 1 --, therefor.

Signed and Sealed this
Seventh Day of July, 2015

Michelle K. Lee
*Director of the United States Patent and Trademark Office*